US007648110B2

(12) United States Patent
Woo

(10) Patent No.: US 7,648,110 B2
(45) Date of Patent: Jan. 19, 2010

(54) BANNER STATION FOR GLASSY SURFACE

(76) Inventor: Cheol-Seok Woo, B-811, SK Twintech Tower B/D, 345-9, Gasan-dong, Geumcheon-gu, Seoul (KR) 153-773

( * ) Notice: Subject to any disclaimer, the term of this patent is extended or adjusted under 35 U.S.C. 154(b) by 83 days.

(21) Appl. No.: 11/815,056

(22) PCT Filed: Aug. 28, 2006

(86) PCT No.: PCT/KR2006/003381

§ 371 (c)(1),
(2), (4) Date: Jul. 30, 2007

(87) PCT Pub. No.: WO2007/027030

PCT Pub. Date: Mar. 8, 2007

(65) Prior Publication Data

US 2009/0038192 A1 Feb. 12, 2009

(30) Foreign Application Priority Data

Aug. 29, 2005 (KR) ..................... 20-2005-0024729

(51) Int. Cl.
*F16B 47/00* (2006.01)

(52) U.S. Cl. ...................................... 248/206.3; 40/597

(58) Field of Classification Search .............. 248/505.5, 248/205.7, 206.1, 206.3, 206.4, 362; 40/597, 40/604

See application file for complete search history.

(56) References Cited

U.S. PATENT DOCUMENTS

| | | | | |
|---|---|---|---|---|
| 5,042,418 | A * | 8/1991 | Hoover et al. | 116/173 |
| 6,370,803 | B1 | 4/2002 | Burquest | |
| 6,643,966 | B2 | 11/2003 | Schmitt | |
| 6,779,765 | B2 * | 8/2004 | Zheng et al. | 248/206.3 |
| 6,808,090 | B2 * | 10/2004 | Pedersen | 222/181.3 |
| 2007/0200037 | A1 * | 8/2007 | Nan | 248/205.5 |

FOREIGN PATENT DOCUMENTS

| | | |
|---|---|---|
| JP | 2001-220783 | 8/2001 |
| KR | 20-0216370 | 3/2001 |
| KR | 10-0487697 | 5/2005 |

* cited by examiner

*Primary Examiner*—Ramon O Ramirez
(74) *Attorney, Agent, or Firm*—DeLio & Peterson, LLC; Peter W. Peterson

(57) ABSTRACT

Disclosed is a banner stand adapted to attach to and detach from a glassy surface. The banner stand includes a vacuum suction plate made of a soft material, a suction latching protrusion protruding from the vacuum suction plate; a lower support having a slanted lateral wall portion formed along a peripheral edge of an upper end of a base ring portion, the slanted lateral wall portion having operation ribs extending thereon at an interval; a suction plate operation member having rib guide protrusions guided on the operation ribs, a suction latching protrusion support, and a ball joint coupler; and a pole support having a pair of ball joints positioned on a bottom surface of a body so as to be coupled to the ball joint coupler of the suction plate operation member.

5 Claims, 2 Drawing Sheets

[Fig. 1]
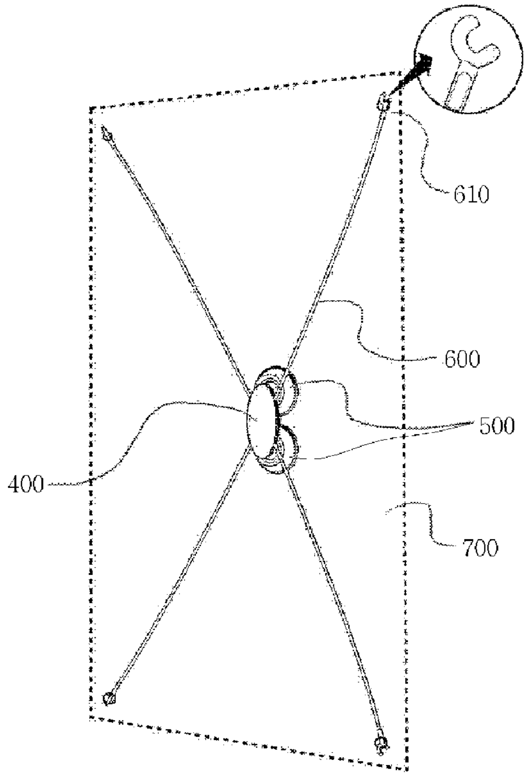
[Fig. 2]
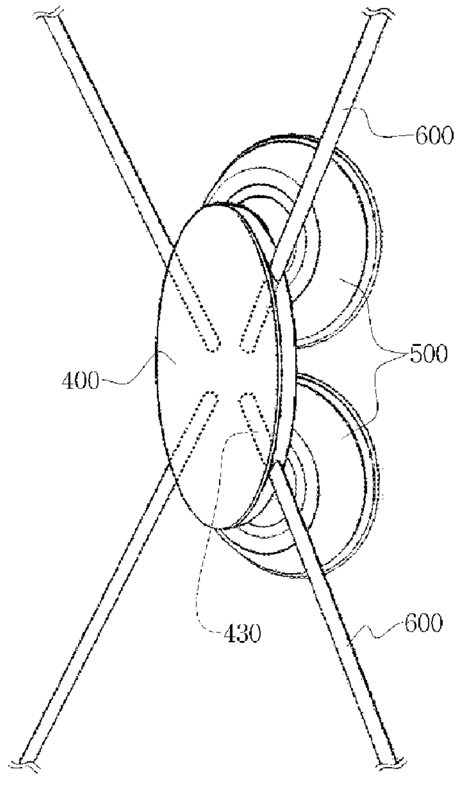

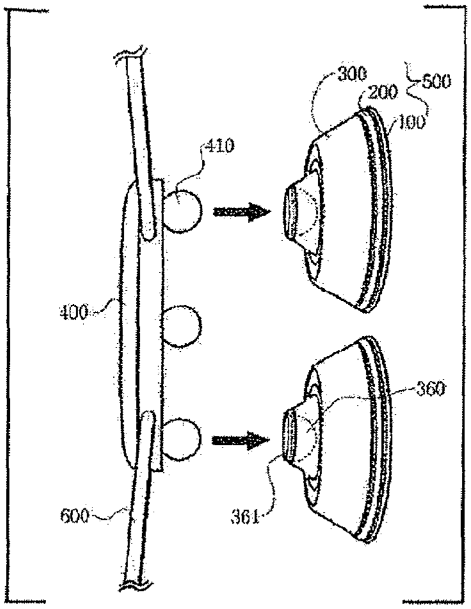
[Fig. 3]
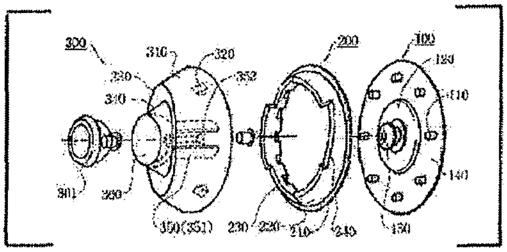
[Fig. 4]
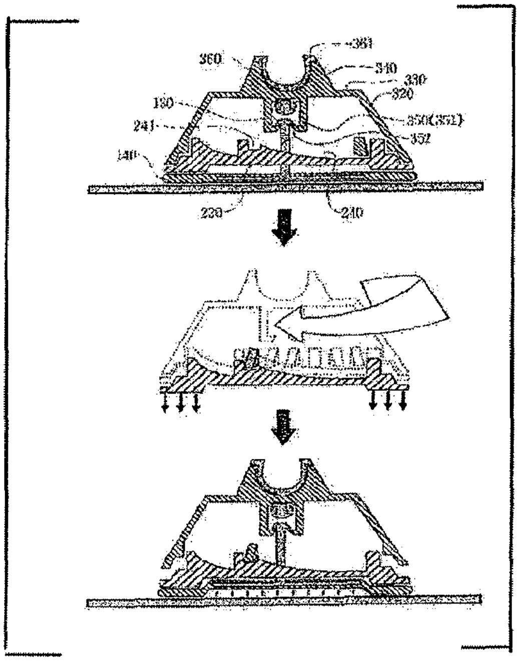
[Fig. 5]

BANNER STATION FOR GLASSY SURFACE

TECHNICAL FIELD

The present invention relates to a banner stand adapted to easily attach to and detach from a smooth and hard surface, such as glass or tiles.

BACKGROUND ART

In general, various shapes of banners are placed along streets in the transverse or longitudinal direction with commercial advertisements or event announcements printed thereon.

In the case of a banner placed in the longitudinal direction, it is customary to position a support in the vertical direction and install a pair of transverse rods along the longitudinal direction of the support in such a manner that the rods are spaced a distance corresponding to the longitudinal length of the banner. The top and bottom of the banner engage with the transverse rods so as to be fixed thereto, respectively. To this end, the banner has support frames placed at its top and bottom, respectively. The support frames extend as much as the transverse length of the banner.

However, this type of banner has a problem in that fixation of the top and bottom of the banner to the transverse rods is unreliable, because the fixation simply depends on engagement between the support frames, which are placed on the top and bottom of the banner, and the transverse rods.

As a result, the banner easily detaches from the support due to strong wind, for example, and flaps in the wind. This increases safety concerns, adversely affects the merits of advertisements or announcements, and degrades the aesthetic view of streets.

Furthermore, the fact that a separate support must be fixed to the ground restricts the selection of installation place and costs a large amount of money. In an attempt to solve these problems, a banner stand, which needs no separate support, has been proposed. For example, Korean Registered Patent No. 487,697 discloses a fixed stand, which will now be described briefly.

The fixed stand includes a body fixed to a to-be-mounted object, the body having a plurality of pole connectors formed along the outer surface at an interval, as well as a bolt through-hole, through which a mounting bolt extends; a mounting member directly mounted on the to-be-mounted object so as to fix the body to the object, the mounting member having a mounting bolt formed thereon so as to extend through the bolt through-hole; a plurality of poles having one side removably mounted on the pole connectors of the body with the other side engaging with a to-be-supported object; and a female screw screw-coupled to the leading end of the mounting bolt, which extends through the bolt through-hole of the body and protrudes from the front surface of the body, so that the body is fixed to the mounting member.

For installation of the fixed stand, the mounting member is firmly fixed to a to-be-mounted object (e.g. wall surface) by a number of screws. After coupling the poles to the body with a to-be-supported object (e.g. banner) supported on the poles, the body is fixed to the mounting bolt of the mounting member by the female screw.

However, the fixed stand has a problem in that its installation involves complicated and inconvenient procedures. Particularly, mounting holes must be made on the wall surface in order to fix the body. After initially fixing the mounting member to the mounting holes with a number of screws, the female screw is coupled to the mounting bolt. When the stand is to be removed, the female screw is unfastened from the mounting bolt, and the screws are unfastened so that the mounting member is released.

Therefore, although the fixed stand may pose no problem when it remains fixed for a long period of time, it is not suited to frequent installation and removal. In addition, the mounting holes remain on the wall surface even after removal of the stand and adversely affect the interior of the building.

In order to avoid these problems, a device adapted for easy mounting and removal has been proposed, as that disclosed in Japanese Patent Publication No. 2001-220783 entitled ROTATABLE SUCTION DEVICE FOR SHOWER HOSE RETAINER, which will now be described briefly.

The rotatable suction device includes a bowl-shaped suction plate made of an elastic material so that it can adhere to a wall surface and a retainer body having a base positioned on the outer peripheral edge of the upper surface of the suction plate so that it can be bonded thereto and an operation unit positioned so as to be operated and rotated relative to the base. A shower hose retainer is positioned between the operation unit and the base outside of the base. Suction force is generated by rotating the operation unit and lifting the suction plate in a direction perpendicular to the wall surface while the base is bonded to the outer peripheral edge of the upper surface of the suction plate.

Particularly, the rotatable suction device has a bolt integrally formed at the center of the upper surface of the suction plate. The operation unit is rotated while an end of the bolt protrudes through a through-hole of the operation unit and remains fixedly supported by a nut. As a result, the bolt is lifted in a direction perpendicular to the wall surface, and so is the suction plate, thereby generating suction force.

However, the rotatable suction device has a problem in that, when the operation unit is rotated, external force acts on the suction plate and tends to rotate it together with the operation unit. This causes the suction plate to slip on the wall surface. Such a slip adversely affects the suction force between the wall surface and the suction plate.

The suction place exerts maximum suction force when its center is pulled to the greatest extent while its bottom surface initially remains flat. However, the fact that the bolt at the center of the suction plate is used to fix the end, which protrudes upwards from the through-hole of the operation unit, with the nut makes it difficult to maintain the bottom surface of the suction plate in an initially flat condition before the suction plate is operated.

This means that, when the bottom surface of the suction plate is not flat after the nut is coupled to the bolt, the suction force exerted by the suction plate decreases seriously.

Furthermore, as the operation repeats rotation for compression and inverse rotation towards original position, the nut is gradually unfastened from the bolt. This weakens the suction force of the rotatable suction device little by little.

As another approach for easy mounting and removal of a banner, Korean Registered Utility Model 20-216370 entitled REMOVAL FLAGPOLE FIXING APPARATUS discloses a device adapted for easy mounting and removal, which will now be described briefly.

The removable flagpole fixing apparatus includes a rotatable flagpole having a screw and a rotatable ball formed on the upper and lower ends thereof, respectively; a flagpole support having a recess formed on the inner wall surface of an opening of its bottom surface and a flagpole insertion hole formed on the upper surface so that the screw of the rotatable flagpole is inserted therein and the rotatable ball engages therewith in order to prevent it from escaping; a clip portion inserted into the flagpole support and fixed thereto, the clip portion having a ball support recess formed on its upper surface so that the rotatable ball is seated thereon, the clip portion having a step formed along the inner wall surface of the opening on the bottom surface so that a button attached to an object engages therewith, the clip portion having a protrusion formed along its outer peripheral surface so as to fit into the recess of the flagpole support, the clip portion being folded along a seam on the outer peripheral surface so as to be bifurcated; and a flag rod having an insert coupler integrally formed therein so that the screw of the rotatable flagpole is fastened thereto.

After the rotatable flagpole is inserted into the flagpole insertion hole of the flagpole support, the clip portion is inserted from behind the flagpole support so that the top surface of the clip portion compresses the bottom surface of the rotatable ball of the rotatable flagpole.

The removable flagpole fixing apparatus has a problem in that, whenever the rotatable flagpole is separated from the flagpole support, the clip portion must be separated from the flagpole support in advance.

This means that, unless the clip portion is separated from the flagpole support, the rotatable flagpole can be neither separated from the upper surface of the flagpole support nor mounted therein.

For easy mounting/removal of the protrusion of the clip portion onto/from the recess of the flagpole support, the flagpole and the clip portion must have at least a predetermined size. This is because the mounting/removal of the protrusion is based on elastic deformation of the lateral wall of the flagpole support within a predetermined range.

Such a requirement on the size of the flagpole support and the clip portion inevitably weakens the gripping force of the rotatable flagpole, which is supported between the flagpole support and the clip portion. This has a problem in that, when the rotatable flagpole is slanted at an angle, it is difficult to maintain the slanted condition for a long period of time.

DISCLOSURE OF INVENTION

Technical Problem

Therefore, the present invention has been made in view of the above-mentioned problems, and it is an object of the present invention to provide a banner stand capable of supporting a banner, which is mounted on the stand for display, without using a separate fastening member (e.g. screw) so that the banner can be attached/detached in any direction for good mobility and easy management; capable of maintaining strong suction force for a long period of time; capable of varying the display direction of the banner within a predetermined angle in any direction; and capable of retaining the banner, the direction of which has been varied, for a long period of time.

It is another object of the present invention to provide a banner stand making it possible to install a banner directly on a wall surface of a building (e.g. room, office) so as to maximize space utilization without interfering with pedestrians in corridors or outside the building.

Advantageous Effects

The banner stand according to the present invention makes it possible to vary the display direction of a banner, which is mounted on the banner stand, in any direction so that the banner faces the advertisement target, i.e. eyes of passers-by, as desired.

The inventive banner stand needs no weight, i.e. support member for supporting a banner on the ground and releases the vacuum condition of the vacuum suction support frequently, so that the banner can be easily attached/detached. This enables convenient movement, handling, and management.

In addition, the banner is directly installed on a wall surface of a building (e.g. room, office) so as to maximize space utilization without interfering with pedestrians in corridors or outside the building.

BRIEF DESCRIPTION OF THE DRAWINGS

The foregoing and other objects, features and advantages of the present invention will become more apparent from the following detailed description when taken in conjunction with the accompanying drawings in which:

FIG. 1 shows a banner stand according to the present invention during use;

FIG. 2 magnifies a banner stand according to the present invention;

FIG. 3 is a lateral view separately showing a pole support and a vacuum suction member according to the present invention;

FIG. 4 is an exploded perspective view showing a vacuum suction member according to the present invention; and FIG. 5 is a sectional view showing a process of attaching a vacuum suction plate to a surface by means of vacuum suction according to the present invention.

BEST MODE FOR CARRYING OUT THE INVENTION

Reference will now be made in detail to the preferred embodiments of the present invention.

The present invention is directed to a banner stand which can easily attach to and detach from a smooth and hard surface, such as glass or tiles, and which can conveniently modify the display direction after attachment.

A banner stand according to an embodiment of the present invention is adapted to attach to and detach from a glassy surface. The banner stand includes a disk-shaped vacuum suction plate having a flat bottom surface, a number of fixing protrusions integrally formed along a peripheral edge of an upper surface, a circular latching protrusion base protruding from a central portion inside the fixing protrusions so as to form a step, and a suction latching protrusion protruding from a central portion of the latching protrusion base; a lower support having an annular base ring portion fastened to a peripheral edge of an upper surface of the vacuum suction plate, a slanted lateral wall portion extending along an inner peripheral surface of the base ring portion so as to form a conical wall surface, fixing protrusion latching grooves formed along an inner peripheral surface of the slanted lateral wall portion, the fixing protrusions being coupled into the fixing protrusion latching grooves, and operation ribs extending along a peripheral edge of an upper end of the slanted lateral wall portion at an interval; a suction plate operation member having a conical first lateral wall portion adapted to externally abut an outer peripheral surface of the slanted lateral wall portion of the lower support, rib guide protrusions formed on an inner peripheral surface of the first lateral wall surface at an interval so as to be guided on the operation ribs, respectively, an upper base integrally formed on an upper end of the first lateral wall portion so as to form a horizontal surface, a second lateral wall portion extending from a central portion of the upper base in a conical shape, a suction latching protrusion support extending downwards from a central portion of the second lateral wall portion with an upper portion of the suction latching protrusion inserted into and fixed to a lower portion of the suction latching protrusion support, and a ball joint coupler coupled to an upper portion of the suction latching protrusion support inside the central portion of the second lateral wall portion; and a pole support having a body, a pair of ball joints positioned on a bottom surface of the body so as to be coupled to the ball joint coupler of the suction plate operation member while being able to play, and a number of pole insertion holes formed on a lateral wall of the body.

The banner stand adapted to attach to and detach from a glassy surface according to the present invention is constructed as follow: the vacuum suction plate, the lower support, and the suction plate operation member constitute an assembly (hereinafter, referred to as a vacuum suction member), to which the pole support is coupled in such a manner that its direction can be varied. Respective components of the banner stand will now be described.

The vacuum suction plate is made of a soft material and has the shape of a disk with a flat bottom surface. The suction latching protrusion is made of a hard material and is positioned at the center of the vacuum suction plate so that the central portion of the vacuum suction plate can be lifted as needed.

The suction latching protrusion on the upper surface of the vacuum suction plate protrudes from the latching protrusion base, which protrudes from the central portion so as to form a step. The disk-shaped suction plate is made of a soft material, but the latching protrusion base, including the suction latching protrusion, is made of a hard material. The latching protrusion base is integrally formed together with the suction plate in an insert molding method, for example.

When the suction latching protrusion is lifted vertically by the suction latching protrusion support of the suction plate support member (described later), a vacuum is created between the central portion of the bottom surface of the vacuum suction plate, which has been lifted, and a to-be-attached object. The vacuum generates strong suction force between them so that the banner, which is fixedly supported on the inventive banner stand, is stably supported on the to-be-attached object.

The fixing protrusions formed along the peripheral edge of the upper surface of the vacuum suction plate engage with the fixing protrusion latching grooves of the lower support (described later). This is for the purpose of preventing the suction latching protrusion from rotating together by means of the frictional force between the suction latching protrusion support and the suction latching protrusion, when the suction plate operation member is rotated so as to rotate the suction latching protrusion support and pull the central portion of the suction latching protrusion.

Particularly, the rotational force of the suction latching protrusion support is inhibited by the engagement between the fixing protrusions and the fixing protrusion latching grooves. If directly transmitted to the vacuum suction plate, the rotational force causes the vacuum suction plate to slip on a to-be-attached surface. This interferes with vacuum creation.

The lower support has an annular base ring portion fastened to a peripheral edge of an upper surface of the vacuum suction plate, which creates a vacuum, so as to support the edge and a slanted lateral wall portion having a number of operation ribs formed thereon at an interval while being slanted so that the suction plate operation member is rotated and guided to pull the suction latching protrusion of the vacuum suction plate.

The base ring portion is fastened to and supports the peripheral edge of the upper surface of the vacuum suction plate, which has the shape of a disk with a flat bottom surface, particularly the outermost peripheral portion of the vacuum suction plate so that, when a vacuum is created by pulling the suction latching protrusion on the central portion of the vacuum suction plate, the resulting attachment force remains at the maximum level.

The operation ribs are formed on the slanted lateral wall, which extends along the inner peripheral surface of the base ring portion, at an interval so as to form a slanted guide surface. When the suction plate operation member is rotated, the rib guide protrusions are guided along the guide surface of the operation ribs so that the suction latching protrusion support is rotated and spaced from the to-be-attached surface. As a result, the suction latching protrusion on the vacuum suction plate is pulled.

The fixing protrusion latching grooves are formed along the inner peripheral surface of the slanted lateral wall so as to engage with the fixing protrusions, respectively. This prevents the rotational force of the suction plate operation member from being directly transmitted to the vacuum suction plate. As a result, the vacuum suction plate does not slip on the to-be-attached surface, and the suction force generated by the vacuum suction plate remains at the maximum level.

The suction plate operation member has first and second lateral wall portions. The first lateral wall portion has rib guide protrusions guided on the operation ribs while being slanted. The second lateral wall portion has a ball joint coupler, to which the ball joints on the bottom surface of the pole support (described later) is coupled while being able to play, and a suction latching protrusion support coupled to the suction latching protrusion so as to pull it.

The ball joint coupler is formed on the upper end of the central portion of the second lateral wall portion as a spherical seating groove. The ball joint coupler has an inner surface made of a soft material so that the spherical ball joints can easily attach/detach and, after attachment, freely change their direction. In addition, the frictional force remains constant for a long period of time so as to maintain the direction of the pole support after modification.

A number of latching pieces are coupled to the suction latching protrusion support so as to form arcs, and each latching piece has a latching step protruding towards the center from its end in an L-shaped configuration. The latching step rotatably engages with the suction latching protrusion and pulls it.

The pole support has a number of pole insertion holes formed on the lateral surface of the body so that poles are inserted therein, in order to stably attach a banner to a surface (e.g. glassy surface).

The pole support has a pair of ball joints formed on its bottom surface in a spherical shape. Each ball joint is fitted to the ball joint coupler, which has an inner surface made of a soft material, so that it is coupled thereto while being able to play.

As such, the banner stand according to the present invention is advantageous in that it can easily attach to and detach from a to-be-attached surface by means of interaction between components of the vacuum suction member, which includes the vacuum suction plate, the lower support, and the suction plate operation member. In addition, the pole support can change its angle while the vacuum suction member is attached to a surface (e.g. glassy surface), so that the display angle of the banner can be varied as desired.

MODE FOR THE INVENTION

A banner stand according to a preferred embodiment of the present invention will now be described with reference to the accompanying drawings.

FIG. 1 shows a banner stand according to the present invention during use, and FIG. 2 magnifies the banner stand according to the present invention.

Referring to the drawings, a vacuum suction plate 100, a lower support 200, and a suction plate operation member 300 are successively coupled and combined so as to constitute a vacuum suction member 500, to which a pole support 400 is coupled so that its angle can be varied easily. Poles 600 are inserted into pole insertion holes 430 formed on a lateral wall of the body 420 of the pole support 400. Banner rings 610 formed on one end of the poles 600 engage with fixing holes 710 formed on corners of a banner 700 for advertisement or announcement.

FIG. 3 is a lateral view separately showing a pole support and a vacuum suction member according to the present invention.

Referring to FIG. 3, the pole support 400 according to the present invention has a pair of ball joints 410 formed on the bottom surface of the body in a spherical shape. Each ball joint 410 is removably coupled to a friction member 361 (made of a soft material) of a ball joint coupler 360 on the suction plate operation member 300, which is the topmost component of the vacuum suction member 500.

As such, the banner stand according to the present invention is advantageous in that the pole support 400 can not only attach to and detach from the vacuum suction member 500 easily, but it can also vary the display direction of the banner within an angular range even after attachment. This is based on the fact that the inner surface of the ball joint support has a spherical shape and that the banner stand has a friction member 361 made of a soft material.

When each ball joint 410 is inserted onto the inner surface of the ball joint coupler 360, which has a portion made of a soft material, it is press-fitted via an enlarged opening. After the fitting, frictional force created between the outer surface of the ball joint 410 and the friction member 361 (made of a soft material) on the inner surface of the ball joint coupler 360 maintains the same condition even after the direction of the banner is varied.

FIG. 4 is an exploded perspective view showing a vacuum suction member according to the present invention.

Referring to FIG. 4, the vacuum suction member 500 according to the present invention includes a disk-shaped vacuum suction plate 100 having a flat bottom surface, a suction plate 140, a number of fixing protrusions 110 integrally formed along a peripheral edge of an upper surface, a circular latching protrusion base 120 protruding from a central portion inside the suction plate 140 so as to form a step, and a suction latching protrusion 130 protruding from a central portion of the latching protrusion base 120; a lower support 200 having an annular base ring portion 210 fastened to a peripheral edge of an upper surface of the vacuum suction plate 100, a slanted lateral wall portion 220 extending along an inner peripheral surface of the base ring portion 210 so as to form a conical wall surface, fixing protrusion latching grooves 230 formed along an inner peripheral surface of the slanted lateral wall portion 220 so that the fixing protrusions 110 are coupled into the fixing protrusion latching grooves 230, and operation ribs 240 extending along a peripheral edge of an upper end of the slanted lateral wall portion 220 at an interval; and a suction plate operation member 300 having a conical first lateral wall portion 310 adapted to externally abut an outer peripheral surface of the slanted lateral wall portion 220 of the lower support 200, rib guide protrusions 320 formed on an inner peripheral surface of the first lateral wall surface 310 at an interval so as to be guided on the operation ribs 240, respectively, an upper base 330 integrally formed on an upper end of the first lateral wall portion 310 so as to form a horizontal surface, a second lateral wall portion 340 extending from a central portion of the upper base 330 in a conical shape, a suction latching protrusion support 350 extending downwards from a central portion of the second lateral wall portion 340 with an upper portion of the suction latching protrusion 130 inserted into and fixed to a lower portion of the suction latching protrusion support 350, and a ball joint coupler 360 coupled to an upper portion of the suction latching protrusion support 350 inside the central portion of the second lateral wall portion 340.

A separate friction member 361 (made of a soft material) is fixed to the inside of the ball joint coupler 360 of the suction plate operation member 300 from behind by a rivet or screw, for example, so that the ball joints 410 can be easily inserted and removed, the display direction of the banner is easily modified, and the direction is maintained after modification.

The suction latching protrusion 130 protruding from the center of the suction plate 140 preferably has the shape of an approximately flat sphere so that, during the manufacturing process, pressure can be applied to the suction latching protrusion support 350 about the suction latching protrusion 130 for easy assembly and, after the assembly process, the suction latching protrusion 130 can rotate inside the suction latching protrusion support 350 when the suction plate operation 300 needs to rotate and generate suction force.

FIG. 5 is a sectional view showing a process of attaching a vacuum suction plate to a surface by means of vacuum suction according to the present invention.

Referring to FIG. 5, the vacuum plate operation member 300, which is the topmost component of the vacuum suction member 500, is rotated clockwise while the vacuum suction plate 500 is placed at a desired location. Then, a vacuum is created between the suction plate 140 and a to-be-attached surface so that a banner is attached to the surface. When the banner is to be removed, the suction plate operation member 300 is rotated counterclockwise so as to release the suction force.

More particularly, the suction plate operation member 300 is rotated clockwise while pressing it with the palm. The suction plate operation member 300 is the topmost component of the vacuum suction plate 500, which is obtained by successively coupling a disk-shaped suction plate 140 with a flat bottom surface, a lower support 200 having a base ring portion 210 fastened to the peripheral edge of the upper surface of the suction plate 140 so as to support it, and a suction plate operation member 300. As a result of the rotation, the rib guide protrusions 320 of the suction plate operation member 300 are lifted/lowered while being guided on the slanted operation ribs 240.

As the rib guide protrusions 320 are lifted/lowered, the suction plate operation member 300 is moved away from the to-be-attached surface as a whole. At the same time, the suction latching protrusion support 350 rises and pulls the suction latching protrusion, which has been locked and coupled thereto. The resulting vacuum created between the central portion of the suction plate 140 and the to-be-attached surface generates suction force.

Preferably, each operation rib 240, which is provided with a slanted surface, has a rib guide protrusion stopping groove 241 formed on its top so that the rib guide protrusion 320 remains stationary and avoids release of the suction force.

When the fixing protrusions 110 are fixed to the fixing protrusion latching grooves 230, the central portion of the suction plate 140 is pulled to the greatest extent while its outermost edge is supported by the lower support. This generates the largest suction force when the suction structure has the same size. This is based on the fact that the bottom surface of the suction plate 140 according to the present invention is initially flat before suction takes place.

As mentioned above, the banner stand according to the present invention is advantageous in that, since compression occurs while the outermost edge of the suction plate 140 is fastened to a to-be-attached surface by the lower support 200 with no slip between the bottom surface of the suction plate 140 and the to-be-attached surface, excellent suction force is obtained. In addition, the display direction of a banner can be easily varied by the pole support 400, which is coupled to the banner and which is removably coupled to the ball joint coupler 360 of the vacuum suction member 500, while the vacuum suction member 500 is attached to the to-be-attached surface.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A banner stand adapted to attach to and detach from a glassy surface, the banner stand comprising:

a disk-shaped vacuum suction plate (100) having a flat bottom surface, a number of fixing protrusions (110) integrally formed along a peripheral edge of an upper surface, a circular latching protrusion base (120) protruding from a central portion inside the fixing protrusions (110) so as to form a step, and a suction latching protrusion (130) protruding from a central portion of the latching protrusion base (120);

a lower support (200) having an annular base ring portion (210) fastened to a peripheral edge of an upper surface of the vacuum suction plate (100), a slanted lateral wall portion (220) extending along an inner peripheral surface of the base ring portion (210) so as to form a conical wall surface, fixing protrusion latching grooves (230) formed along an inner peripheral surface of the slanted lateral wall portion (220), the fixing protrusions (110) being coupled into the fixing protrusion latching grooves (230), and operation ribs (240) extending along a peripheral edge of an upper end of the slanted lateral wall portion (220) at an interval;

a suction plate operation member (300) having a conical first lateral wall portion (310) adapted to externally abut an outer peripheral surface of the slanted lateral wall portion (220) of the lower support (200), rib guide protrusions (320) formed on an inner peripheral surface of the first lateral wall surface (310) at an interval so as to be guided on the operation ribs (240), respectively, an upper base (330) integrally formed on an upper end of the first lateral wall portion (310) so as to form a horizontal surface, a second lateral wall portion (340) extending from a central portion of the upper base (330) in a conical shape, a suction latching protrusion support (350) extending downwards from a central portion of the second lateral wall portion (340) with an upper portion of the suction latching protrusion (130) inserted into and fixed to a lower portion of the suction latching protrusion support (350), and a ball joint coupler (360) coupled to an upper portion of the suction latching protrusion support (350) inside the central portion of the second lateral wall portion (340); and a pole support (400) having a body (420), a pair of ball joints (410) positioned on a bottom surface of the body (420) so as to be coupled to the ball joint coupler (360) of the suction plate operation member (300) while being able to play, and a number of pole insertion holes (430) formed on a lateral wall of the body (420).

2. The banner stand as claimed in claim 1, wherein the vacuum suction plate (100) comprises a disk-shaped suction plate (140) having a flat bottom surface, the suction plate (140) being made of a soft material, and the latching protrusion base (120), the suction latching protrusion (130) protruding from the central portion of the latching protrusion base (120), is made of a hard material and is integral with the suction plate (140) so as to protrude from a central portion of the suction plate (140) and form a step.

3. The banner stand as claimed in claim 1, wherein the operation ribs (240) of the lower support (200) have a guide protrusion stopping groove (241) formed on an upper end so to seat the rib guide protrusions (320), respectively.

4. The banner stand as claimed in claim 1, wherein a number of latching protrusion latching pieces (351) are coupled to the suction latching protrusion support (350) of the suction plate operation member (300) so as to form arcs, each latching protrusion latching piece (351) having a latching step (352) protruding towards a center from an end in an L-shaped configuration.

5. The banner stand as claimed in claim 1, wherein the ball joint coupler (360) of the suction plate operation member (300) has a friction member (361) formed on an inner peripheral surface, the friction member (361) being made of a soft material.

* * * * *